May 6, 1958 J. S. NAERY 2,833,105
TRANSPORT TRUCK FOR WINDROWERS
Filed May 31, 1955 3 Sheets-Sheet 1
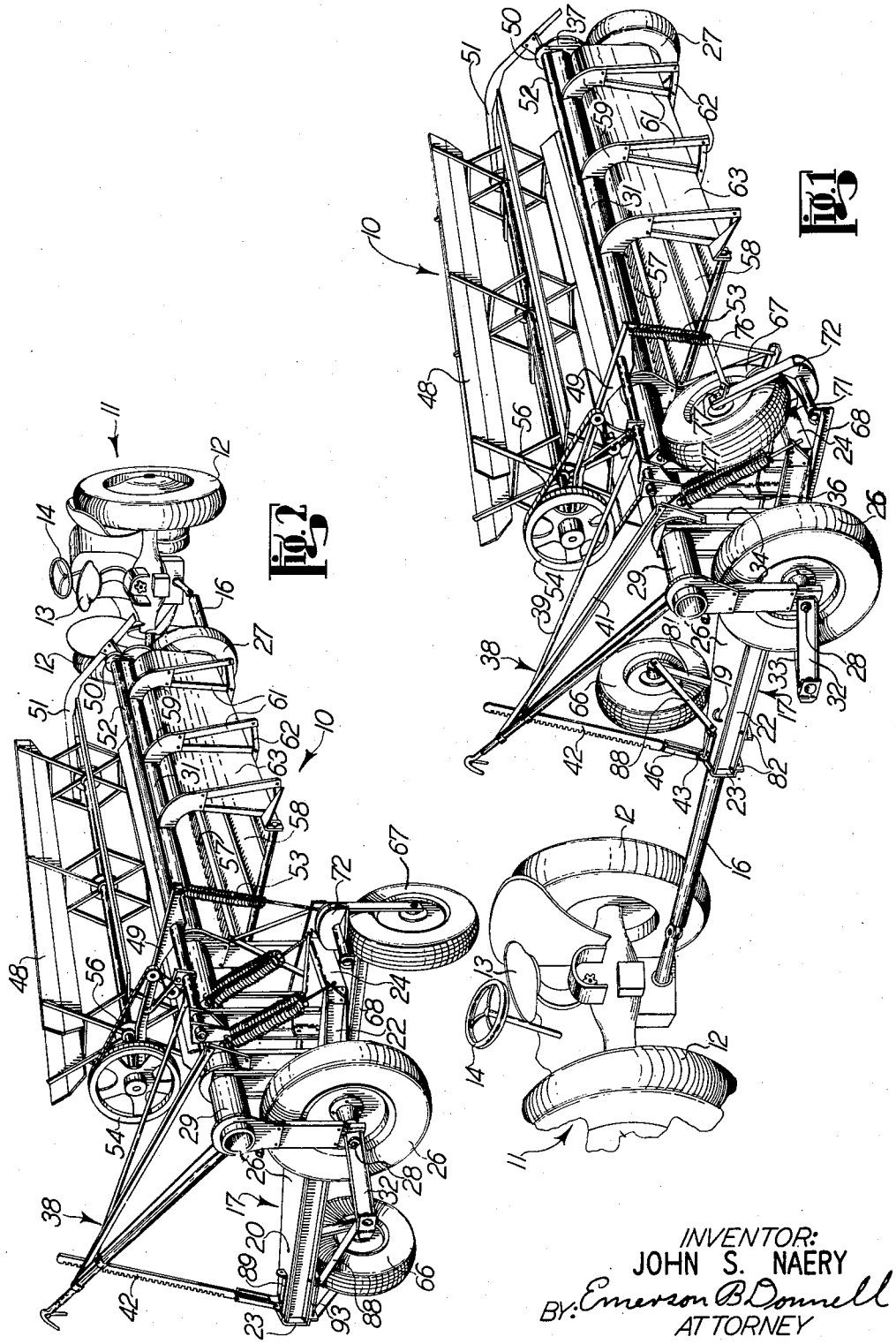
INVENTOR:
JOHN S. NAERY
BY: Emerson B Donnell
ATTORNEY

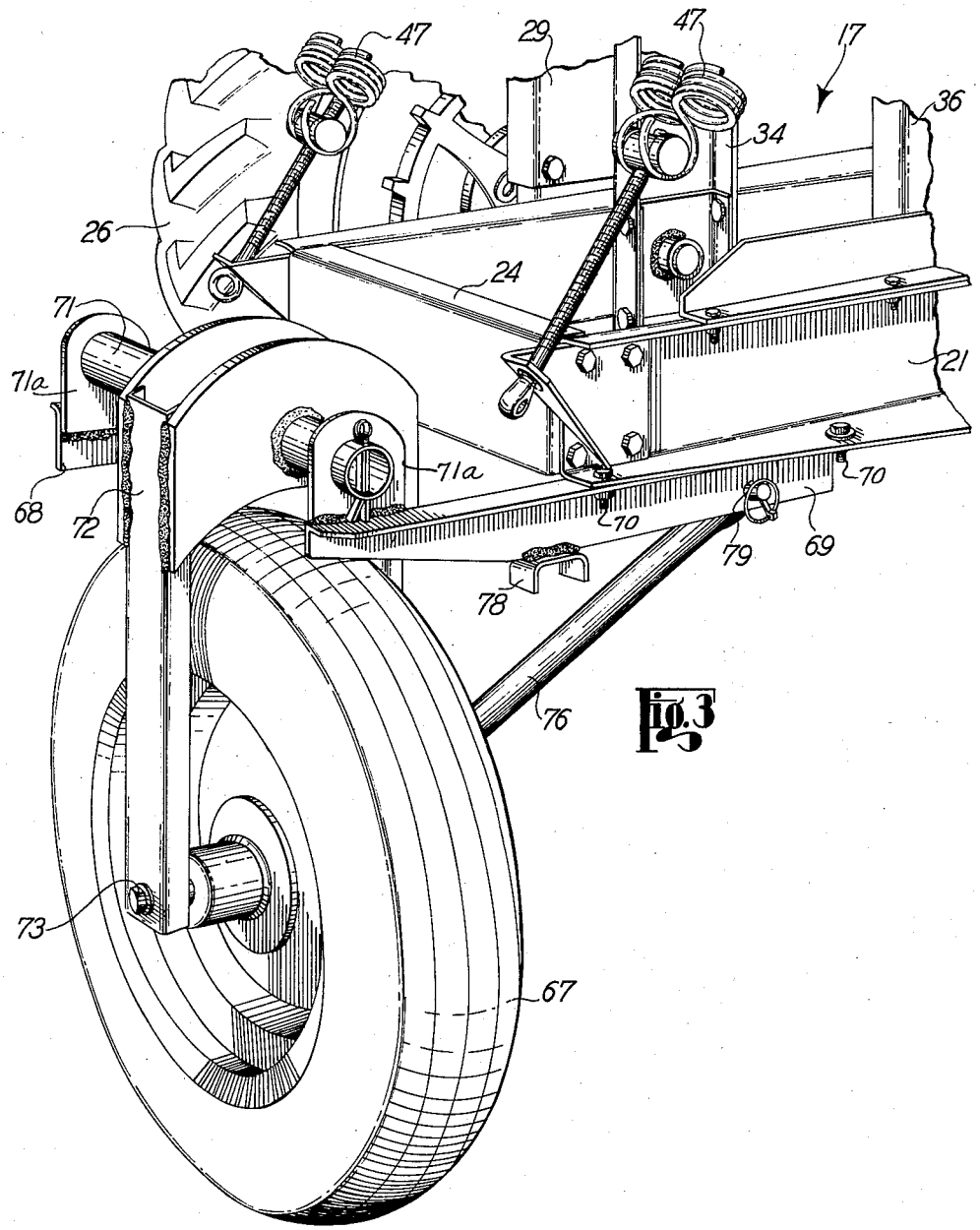

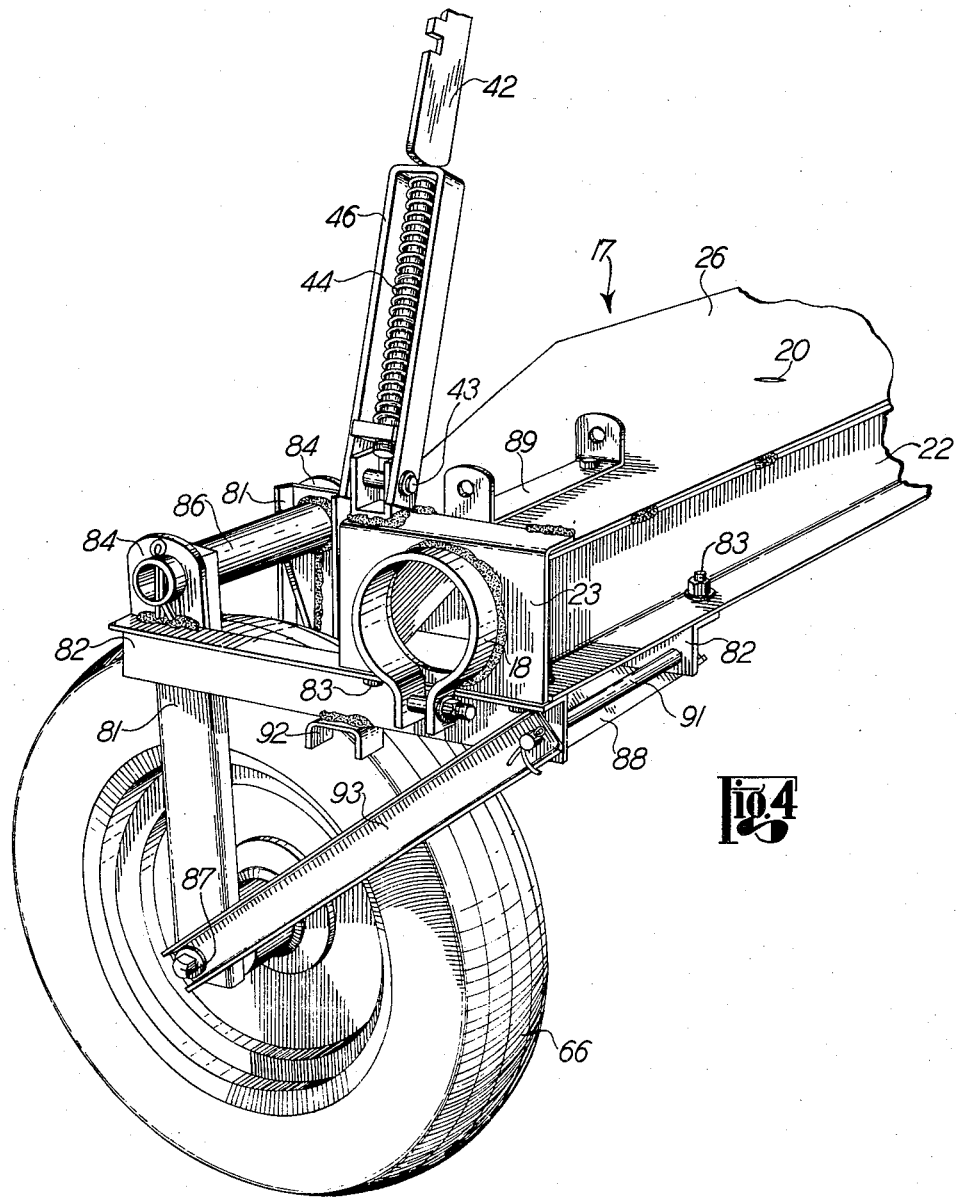

United States Patent Office 2,833,105
Patented May 6, 1958

2,833,105

TRANSPORT TRUCK FOR WINDROWERS

John S. Naery, Racine, Wis., assignor to J. I. Case Company, Racine, Wis., a corporation of Wisconsin Application May 31, 1955, Serial No. 512,010

2 Claims. (Cl. 56—228)

This invention relates to agricultural machines, and, more particularly, it relates to a transport truck for windrowers.

Windrowers of the type which are the subject of this invention are towed by a tractor and extend twelve or fifteen feet in width. Obviously, in transporting a windrower of that type from field to field, along a road or through narrow gates, and many other places, the excess width presents a problem of transportation. In the past, some of the wide windrowers have been provided with detachable carriages which permit the windrower to be towed in the direction of its width and it can then be easily transported since its new width is less than its width in a windrowing position.

It is an object of this invention to provide a wide windrower with a transport truck which permits ready conversion of the windrower from mobility in the direction of operation to mobility in the direction of transport.

It is a particular object of this invention to provide a wide windrower which can be converted from mobility in operation to mobility in transport with a minimum of time and effort, and without requiring the addition of loose and separate wheels or other parts and without special tools.

Still another object is to provide a simple and efficient means for altering existing wide windrowers for transporting said windrowers through narrow passageways.

These and other objects and advantages will become apparent upon reading the following description in conjunction with the accompanying drawings, wherein:

Fig. 1 is a rear perspective view of a windrower having a preferred embodiment of this invention and with a fragmentary showing of a tractor, all shown in the windrowing operation position.

Fig. 2 is a rear perspective view of the embodiment shown in Fig. 1 but with the windrower and the tractor in the transport position.

Fig. 3 is an enlarged fragmentary front perspective view showing the windrower right hand transport wheel in the transport position of Fig. 2.

Fig. 4 is an enlarged fragmentary rear perspective view showing the windrower left hand transport wheel in the transport position of Fig. 2.

The same reference numerals refer to the same parts throughout the several views.

Figs. 1 and 2 show a windrower 10 and a fragment of a tractor 11 attached thereto in different towing positions between the two views. The windrower is a conventional construction, such as that shown in U. S. Patent 2,395,672, except for the transport wheels described in detail hereinafter. Also, the tractor is of a conventional type. Therefore, a detailed description of the entire windrower and the tractor is not required in the present disclosure to constitute a complete description of this invention as reference may be made to the cited patent and other descriptions for more detail.

As shown in Fig. 1, the tractor 11 is attached to the windrower in the operating position of the latter. Thus, the usual tractor rear wheels 12, seat 13, and steering wheel 14 are positioned as shown while a drawbar 16 is suitably attached to the rear of the tractor and is attached to the frame 17 of the windrower. The drawbar 16 and the drawbar frame 17 are detachably secured together as the former is telescoped within the collar 18, shown in Fig. 4, on the frame 17 and a pin 19 passes through aligned holes, such as hole 20, in the frame 17 and the drawbar 16, as shown in Fig. 3 of the cited patent. The drawbar 16 can then be detached from the frame 17 and re-attached to the windrower in the Fig. 2 position, as shown in Fig. 2 of the cited patent. The frame 17 is comprised of spaced apart channels 21 and 22 with interconnecting end pieces 23 and 24 and top plate 26a extended only part way along the frame 17. The piece 23 is at the front end of the drawbar frame, and the piece 24 is at the rear end thereof.

The windrower is supported on the ground, in the Fig. 1 operating position, by the usual wheels 26 and 27. The windrower direction of operation is, therefore, the usual direction in which the wheels 26 and 27 will roll. The wheel 26 is shown positioned outside of the frame 17 instead of inside the frame as shown in the cited patent; however, that difference is not material in this invention. To support the windrower 10 on the wheels 26 and 27, the axle 28 of the wheel 26 is attached to a fork-like portion generally designated as 29 depending from the windrower main frame tube 31 which extends across the windrower. Also, a brace 32 is pivotally attached at one end to the axle 28 and is pivotally attached at the other end to a member 33 rigid with the frame 17, in any suitable manner. Upright members 34 and 36 are attached to the frame 17 to support one end of the tube 31. The opposite wheel 27 supports the opposite end of the tube 31 with a similar upright member 37 extended between the axle of the wheel 27 and the tube 31.

With this arrangement, other parts of the windrower are supported by the tube 31, and the entire windrower, therefore, is pivotally adjustable about the axes of the wheels 26 and 27. Thus, the usual tilting lever 38 includes a member 39 attached to the tube 31 and a member 41 attached to the lower end of the upright member 34. The usual quadrant or rack 42 is pivoted at bolt 43 to the frame 17 to engage the lever 38 in a selected position. In this instance, a compression spring 44 is disposed between the lower end of the quadrant 42 and a bracket 46, to which the quadrant 42 is connected, and the spring urges the quadrant downwardly but allows it and the front of the windrower to rise if an obstruction is met during operation. Also, of course, the tilting lever can be set to a selected position to control the height of the cutting done by the windrower.

Counterbalance tension springs 47 are attached between the tube 31 and the frame 17 in the usual manner to support some of the load on the tractor side of the windrower. Thus, the springs tend to pull the tube 31 rearwardly to raise the tractor side of the windrower.

The usual reel 48 is rotatably supported through angle irons 49 and 51 attached to a tube 52 which is in turn attached to the tube 31 through interconnecting brackets such as bracket 50. Here also the rear end of the member 49 is spring-loaded to the frame 17 by a tension spring 53 which urges the tractor side of the windrower into a raised position along with the springs 47. A sprocket 54 and chain 56 power the reel 48 from the ground wheel 26 in the usual manner. Also, the usual cutter bar 57 is disposed to the tractor side of the windrower and is powered by the ground wheels.

The windrower 10 also includes a platform 58 which is supported from the tube 31 by plates 59 attached to the tube and having upright members 61 depending from the plates 59 to connect to members 62 extended across the bottom of the platform 58. A baffle 63 is arranged substantially vertically against members 61 and serves to prevent material that is harvested by the cutter bar 57 from being thrown over the rear of the platform 58 by the reel 48. The platform and the baffle do not extend through the length of the windrower and the usual opening or gap shown is provided to permit the crop to drop therethrough and onto the ground in the usual manner.

Referring to the improvement provided by this invention, it will be noted that the windrower 10 is convertible from the Fig. 1 operating position to the Fig. 2 transport position. To this end, two wheels 66 and 67 are adjustably attached to the windrower to permit positioning of the wheels in the down or ground engaging transport position wherein the other wheels 26 and 27 are then raised clear of the ground, as shown. The right hand wheel 67 is preferably secured to the frame 17 by a pair of angles 68 and 69 which are attached to the frame in any suitable manner as by bolts 70 to support a shaft 71, as shown. The latter is disposed parallel to the tube 31 and is rotatable in brackets 71a at the ends of the angles 68 and 69. Shaft 71 connects to a mounting link preferably in the form of a bifurcated wheel frame member or yoke 72 which receives an axle 73 at the open end of the member 72 to rotatably support the wheel 67. A holding link or brace 76 is pivotally attached to the member 72 through a bracket 77 located at the axle end of the member 72 and at its other end is secured to angle 69 as will appear later. As shown in the raised position of Fig. 1, the wheel 67 is positioned to be over center and rest against the windrower.

When it is desired to move the wheel 67 to the transport position of Figs. 2 and 3, a jack may be placed below the pad 78 secured to the angle 69 and the windrower can then be raised off the ground to where the wheel 67 is pivoted below to the ground position shown. The brace 76 is then suitably attached to the angle 69 by a pin 79 passing through the angle 69 and the brace 76 in any suitable manner so the wheel is rigidly supporting the windrower.

The left hand wheel 66 is supported on the frame 17 by a mounting link including a yoke having a pair of arms 81 constituting a wheel frame pivotally attached to the frame 17 through two spaced apart angle irons 82. The latter are attached to the frame 17 by bolts 83 and extend endwise therefrom to brackets 84 which rotatably support a shaft 86 as shown in Fig. 4. The arms 81 are thus attached to the shaft 86 to project therefrom on opposite sides of the wheel 66 to be secured to the wheel axle 87, and the arms 81 and the shaft 86 can be formed together like a yoke or a frame.

In the Fig. 1 position, the wheel 66 is raised while a brace 88 secures the wheel in this position by being attached between the wheel axle and a bracket 89 on the frame 17. A removable pin 91 secures the brace and the bracket together. Release of the pin 91 and jacking up of the windrower at the point of the jack pad 92, will permit the wheel 66 to be swung to the Figs. 2 and 4 position. The brace 88, and a similar brace 93, attached to the wheel axle at the opposite side of the wheel, are then secured to the respective ends of the angle irons 82 by the pin 91 to provide a holding link for wheel 66.

Thus, a conventional windrower can be easily and readily constructed to include the transport wheels 66 and 67 of this invention. The wheels are then properly located with their axles in substantial alignment for the required balance of the windrower in the transportation thereof and they can be readily adjusted by swinging them about their pivotal connections to the drawbar frame for either the position of operation or transportation.

Although only one preferred embodiment of this invention has been shown and described, it should be obvious that certain changes could be made within the scope of the invention which should, therefore, be limited only by the appended claims.

I claim:

1. A transport truck for a windrower or the like which includes a drawbar frame horizontally disposed at one end of the windrower and elongated in the direction of windrower operating movement to present a front end and a rear end of the drawbar frame, a pair of transport supporting wheels having substantially aligned axles, one of said wheels being operatively attached to the front of said frame and the other of said wheels being operatively attached to the rear of said frame, the front wheel having a mounting link pivotally connected to said frame about a longitudinal axis thereof and further having a holding link detachably attached to said frame which may be detached to enable said front wheel to be swung to inoperative position, the rear wheel having a mounting link pivotally connected to said frame about a transverse axis thereof and further having a holding link detachably attached to the frame which may be detached to enable said rear wheel to be swung to an inoperative position.

2. A transport truck for a windrower or the like in accordance with claim 1 in which the mounting link for each of said wheels is in the form of a yoke.

References Cited in the file of this patent

UNITED STATES PATENTS

| | | |
|---|---|---|
| 851,345 | Crane | Apr. 23, 1907 |
| 1,837,056 | Meier | Dec. 15, 1931 |
| 1,941,821 | Baker | Jan. 2, 1934 |
| 2,395,672 | Kranick et al. | Feb. 26, 1946 |
| 2,509,824 | Johnson | May 30, 1950 |